(12) United States Patent
Ponemayr et al.

(10) Patent No.: US 10,532,486 B2
(45) Date of Patent: Jan. 14, 2020

(54) METHOD FOR PRODUCING CUTTING BLADES

(71) Applicant: BOEHLER PROFIL GmbH, Boehlerwerk (AT)

(72) Inventors: Helmut Ponemayr, Steyr (AT); Helmut Maisser, Sonntagberg (AT)

(73) Assignee: BOEHLER PROFIL GMBH, Boehlerwerk (AT)

( * ) Notice: Subject to any disclaimer, the term of this patent is extended or adjusted under 35 U.S.C. 154(b) by 1280 days.

(21) Appl. No.: 14/173,398

(22) Filed: Feb. 5, 2014

(65) Prior Publication Data

US 2015/0122103 A1 May 7, 2015

(30) Foreign Application Priority Data

Nov. 5, 2013 (AT) ............................. A 50731/2013

(51) Int. Cl.
*B23P 15/38* (2006.01)
*C21D 1/02* (2006.01)
(Continued)

(52) U.S. Cl.
CPC ............ *B27L 11/005* (2013.01); *B23P 15/38* (2013.01); *C21D 1/02* (2013.01); *C21D 1/42* (2013.01);
(Continued)

(58) Field of Classification Search
CPC ........ B23P 15/38; B23P 15/40; B23P 15/406; B21H 7/10; B27L 11/005;
(Continued)

(56) References Cited

U.S. PATENT DOCUMENTS 3,290,917 A * 12/1966 Don ..................... B23D 73/00
                                                          72/326
4,660,777 A *  4/1987 Schaefer ............... B27L 11/02
                                                          241/188.1
(Continued)

FOREIGN PATENT DOCUMENTS

AT            377 225         2/1985
DE         196 05 072        10/1997
(Continued)

OTHER PUBLICATIONS

Machine Translation of EP1358980.*
(Continued)

*Primary Examiner* — Teresa M Ekiert
(74) *Attorney, Agent, or Firm* — Greenblum & Bernstein, P.L.C.

(57) ABSTRACT

Disposable cutting blades and method for producing disposable cutting blades with profiled cross sections for a device for chipping wood. The method includes heating a primary material of a hardenable material in a soft-annealed state having a worked surface to a temperature above room temperature, but below a conversion temperature Ac1, rolling the primary material to form a profile blank with at least one precisely gaged guide path in a base body in cross section and with an increased thickness of at least one edge region, a metal-removing working of at least one edge region in a longitudinal direction of the profile blank to form a cutting edge and to form scratching edges in a spaced manner directed perpendicularly to the cutting edge, and continuously hardening the edge regions of the cutting blade.

15 Claims, 2 Drawing Sheets

(51) Int. Cl.
*C21D 9/00* (2006.01)
*B27L 11/00* (2006.01)
*C21D 1/42* (2006.01)

(52) U.S. Cl.
CPC ......... *C21D 9/0068* (2013.01); *Y10T 83/9495* (2015.04)

(58) Field of Classification Search
CPC . B21B 2001/221; B21B 1/08; B21B 15/0007; C21D 1/02; C21D 8/0236; C21D 9/18
USPC .......................................................... 72/206
See application file for complete search history.

(56) References Cited

U.S. PATENT DOCUMENTS

| | | | | |
|---|---|---|---|---|
| 4,753,379 | A | * | 6/1988 | Blasberg ............ B23D 36/0066 140/89 |
| 5,014,412 | A | * | 5/1991 | Nobis ..................... B21B 1/466 29/527.7 |
| 5,093,975 | A | * | 3/1992 | Masters ................. B23D 19/06 76/101.1 |
| 5,823,856 | A | | 10/1998 | Pallmann |
| 2007/0169848 | A1 | | 7/2007 | Holzer |
| 2009/0200411 | A1 | | 8/2009 | Stager |
| 2010/0163662 | A1 | * | 7/2010 | Andersson ............ B27L 11/005 241/282.2 |
| 2012/0227547 | A1 | * | 9/2012 | Maisser ................... B21H 7/10 76/104.1 |
| 2014/0290322 | A1 | * | 10/2014 | Evertz ................. B21D 22/208 72/47 |

FOREIGN PATENT DOCUMENTS

| | | |
|---|---|---|
| DE | 10 2005 003 366 | 7/2006 |
| EP | 0 052 670 | 6/1982 |
| EP | 1 358 980 | 11/2003 |
| EP | 1 920 875 | 5/2008 |
| GB | 2 066 729 | 7/1981 |
| WO | WO2011/063435 | 6/2011 |

OTHER PUBLICATIONS

Austrian Office Action issued in Austrian Application No. A50731/2013 and dated Jul. 1, 2014 (4 pages).
European Search Report issued in EPO Application No. 14455005 and dated Mar. 20, 2015 (6 pages).

* cited by examiner

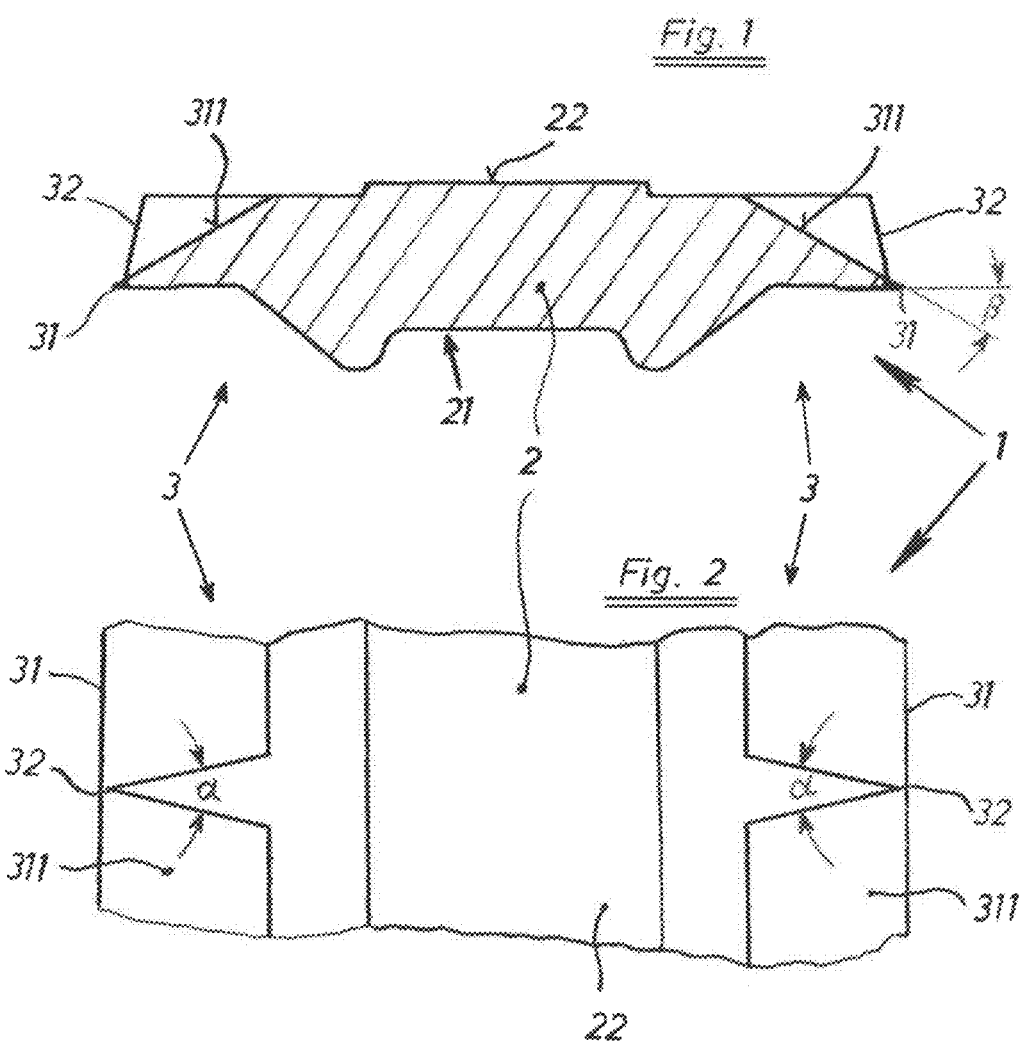

METHOD FOR PRODUCING CUTTING BLADES

CROSS-REFERENCE TO RELATED APPLICATIONS

The present application claims priority under 35 U.S.C. § 119 of Austrian Patent Application No. A 50731/2013, filed Nov. 5, 2013, the disclosure of which is expressly incorporated by reference herein in its entirety.

BACKGROUND OF THE INVENTION

1. Field of the Invention

The invention relates to a method for producing disposable cutting blades with a profiled cross section for a device for chipping wood.

Furthermore, the invention relates to a disposable cutting blade with a profiled cross section for devices for chipping wood, comprising a base body with at least one precisely gaged guide path in a longitudinal direction, as well as at least one pressure surface opposing this guide path and at least one edge region spaced from the guide path with a cutting edge.

2. Discussion of Background Information

For a production of oriented strand boards (OSB) with high quality, the quality of the raw material, i.e., of the chips, is of particular importance. Furthermore, the accumulation of splinter particles should be kept as low as possible during a chip production. The main requirements for a chipping of the base material wood result therefrom, namely uniformity of the chips regarding the thickness and the length of the chips with straight-line cuts.

A constant thickness of the chips and the surface quality thereof can be achieved during the long-term operation of a chipping device by the wearing resistance of the edge of the blades. For a required chip length, scratching knives or scratching blades are used which, before a chipping-off of the wooden primary material, scratch this material. In this way, the chips produced have a desired or an approximately equal length.

In the working part of a device for chipping wood, which is usually disk-shaped, cutting blades and scratching knives or scratching blades are often separately positioned on the turning circle with blades directed perpendicularly to one another.

During operation of the above devices, a varying wear of the cutting blades and scratching blades can occur. In this manner, either the chip quality decreases or an expensive replacement of the damaged blades must take place.

For the purpose of illustration, wood chips that were separated by defect-free (sharp) blades can be seen in FIG. 3, while the effect of worn (dull) scratching blades on the chipping cut can be seen in FIG. 4.

In order to increase the efficiency of the operation of a device for chipping wood, it was already attempted to provide the scratching blades in the chip-removal tool in the form of an integral component.

According to EP 1 358 980 A, it is recommended to optimize the production and re-sharpening of two-dimensionally operating blades for chipping machines and, thus, the production of chips. These blades have a main edge and at least one separating edge, are embodied in one piece, and can be produced in one piece from commercially available standard blades without a problem in terms of grinding.

However, cutting blades of this type, which are not generally available on the market, have serious disadvantages.

An accurate bracing of the commercially available standard blades for a production of a blade, and an exact clamping of the manufactured or re-sharpened blades in the blade holder can only be achieved at high cost, since the blades are held via frictional fit by means of a clamping plate and chipping forces act intermittently on each blade during rotations of the blade ring, which forces can displace these blades. Subsequently, different chip thicknesses may arise.

Commercially available standard blades are rolled products, the deformation direction of which ultimately corresponds to the main edge direction and can disadvantageously affect an edge durability.

Furthermore, a grinding of a possibly hardened standard blade is disadvantageous because a grinding removal in the thin edge region of the blade can produce a material heating that leads to a softening of the blade. This applies in particular to cutting blades, which thus possibly have a higher wear after brief use.

SUMMARY OF EMBODIMENTS

Embodiments of the present invention is directed to a method for the production of disposable reversible cutting blades of the type named at the outset which overcomes the existing disadvantages in the prior art, ensures an improved blade quality, enables a highly economical operation of a device for chipping wood, and allows a high quality of the chips to be achieved with minimal waste.

Accordingly, embodiments are directed to a class-conforming method in that, in a first step, a primary material of hardenable steel or of a hardenable alloy in the soft-annealed state and with a worked surface is heated to a temperature above the room temperature, but below the conversion temperature $Ac_1$, that is, within the range of the cubic-space-centered atomic structure of the material, and, preferably with an overfilled groove, rolled to form a profile blank with at least one precisely gaged guide path in the base body in cross section and with an increased thickness of at least one edge region, whereupon, in a second step, possibly after an intermediate storage, a metal-removing working of at least one edge region occurs in a longitudinal direction of the profile blank, provided that a cutting edge is formed and scratching edges are formed in a spaced manner directed perpendicularly to this cutting edge and that the ridge of the cutting edge is removed, whereupon, in a third step, the edge regions of the cutting blade are continuously hardened, possibly with a buffer therebetween.

The advantages achieved by the invention are essentially founded in that, in the first process step, the preliminary material is effectively cold formed and strengthened to a hardness of at least 30 HRC.

The expression "cold formed" refers to a deformation at a temperature below the $Ac_1$ point of the alloy.

The profile blank is provided with mating surfaces which ensure an exact positioning of the blade.

A rolling with a free spreading, possibly in an overfilled groove, produces a material flow towards the edge regions, which has a positive effect on an achieved cutting edge quality and scratching edge quality or cutting edge durability and scratching edge durability.

According to embodiments, a machining of the edge regions of the blank occurs by milling. On the one hand, the temperature of the edge is not increased above the rolling temperature of the primary material during a milling, even with an efficiently high metal removal, so that no change in the deformation structure in the blank occurs, and on the other hand, there results no change in the mill shape during long-term operation, whereby a high precision of the working surfaces is ensured.

Furthermore, it is important to remove the ridge of the cutting edges in order to create optimal conditions for achieving the best cutting edge quality.

In a hardening after an induction heating with a subsequent accelerated cooling, and possibly with an annealing of the hardened structure during the pass-through of the cutting blade, the hardness penetration depth is to be at least 1.5 mm, but below 2.5 mm, in order to achieve a material hardness in the edge region of at least 58 HRC with high strength and, in the transition to the work-hardened part of the blade, the strength increases further and a breakaway danger of the blade in hard operation is minimized.

According to the embodiments, the cutting blades are advantageously continuously produced in the form of multiple lengths in the three respective steps from the primary material until after a hardening of the edges, and a separation into individual blades is subsequently conducted. This production method ensures a consistently superior level of quality and a high efficiency of the blades according to the invention.

Furthermore, embodiments of the invention create a disposable cutting blade for chipping wood which can be positioned in a device therefor in a precisely fitting manner, has both cutting edges and also scratching edges in a single-piece shape, and has optimal use characteristics with a long service life, in particular with identical wear of the cutting edge profiles and the scratching edge profiles.

Accordingly, a disposable cutting blade with a profiled cross section is achieved. The disposable cutting blade comprises a base body with at least one precisely gaged guide path in a longitudinal direction, as well as at least one pressure surface opposing this guide path and at least one edge region spaced from the guide path with a cutting edge, wherein scratching edges project away from the cutting edge with a blade angle $\beta$ of 8°-25° spaced in a longitudinal direction perpendicularly to this cutting edge, which scratching edges have a wedge angle $\alpha$ of 25°-33°, measured perpendicularly to the flank of the cutting edge, and the cutting edge regions and scratching edge regions have a hardness of at least 58 to 63 HRC up to a depth of at least 1.5 mm.

According to a preferred embodiment, it is provided according to the invention that the blade shape is produced in a metal-removing manner from a roll-hardened profile blank with a hardness of at least 30 HRC by milling the edge regions. Through a material hardness of the base body of higher than 30 HRC, a desired stability of the blade is achieved in practical chipping use, wherein a metal removal by milling can occur in an economical manner.

Furthermore, if the scratching edge is, in the longitudinal extension thereof, embodied in a perpendicular or lagging manner to the cutting edge in the direction of the flank, the type of wood to be chipped or the wood quality can respectively be taken into account for the production of high-grade chips.

For an advantageous chip separation, but also for a decreased blade load, it can be provided that the scratching edge projects away from the cutting edge or is formed projecting out of the flank with a distance of up to 0.8 mm from the cutting edge.

Advantageously, the cutting blades are, according to the invention, formed from a cold work steel with a composition according to Register of European Steels number classes 20 through 23 or from a high speed steel according to number class 33 so that, through a material selection, a highly economical use for a chipping is possible as a function of the wood property.

If, in an advantageous manner, the surface in the edge region of the cutting blade is at least partially coated, a particularly long service life of the cutting blade can be achieved in harsh use. Among other things, the CVD process and PVD process are provided as coating methods, wherein the surface layers can be formed from pure metal, from carbide, oxide, nitride or mixed forms thereof of in particular chromium and titanium.

Embodiments of the invention are directed to a method for producing disposable cutting blades with profiled cross sections for a device for chipping wood. The method includes heating a primary material of a hardenable material in a soft-annealed state having a worked surface to a temperature above room temperature, but below a conversion temperature Ac1, rolling the primary material to form a profile blank with at least one precisely gaged guide path in a base body in cross section and with an increased thickness of at least one edge region, a metal-removing working of at least one edge region in a longitudinal direction of the profile blank to form a cutting edge and to form scratching edges in a spaced manner directed perpendicularly to the cutting edge, and continuously hardening the edge regions of the cutting blade.

According to embodiments, the hardenable material can include hardenable steel or a hardenable alloy.

In accordance with other embodiments, the temperature may be achieved within a range of a cubic-space-centered atomic structure of the material.

Further, the profile blank can be rolled with an overfilled groove.

In other embodiments, the method can also include an intermediate storage prior to the metal-removing working.

In still other embodiments of the invention, edge regions of the cutting blade may be continuously hardened a buffer therebetween.

According to further embodiments, the method can include removing a ridge of the cutting edge. Further, after the metal-removing working, by which the edge region of the profile blank is milled, whereby the at least one cutting edge with a flank and the scratching edges of the blade projecting away from this flank in a spaced manner are spaced, the method can include removing the ridge from the edge, which is a machined surface region opposite the flank, with a tool. The tool may be a ceramic tool.

Moreover, the primary material can include a rod or wire with a round cross section for grooved rolling of the profile blank and a quick heating of the rod or wire occurs via electric induction.

In accordance with still other embodiments of the invention, the method can also include switching on a buffer device compensating the feed differences in at least one of a differing and intermittent feed of the profile blank during the milling or in the metal-removing working and in a continuous feed during the continuous hardening of the cutting edges.

Embodiments of the invention are directed to a disposable cutting blade with a profiled cross section for devices for chipping wood. The blade includes a base body with at least one precisely gaged guide path in a longitudinal direction, at least one pressure surface opposing the guide path and at least one edge region spaced from the guide path with a cutting edge. Scratching edges, projecting away from the cutting edge, have a wedge angle of 26° to 34°, spaced in a longitudinal direction perpendicularly to the cutting edge and measured perpendicularly to the flank of the cutting edge, and the cutting edge regions and scratching edge regions have a hardness of at least 58 to 63 HRC up to a depth of at least 1.5 mm.

According to embodiments, the scratching edges can have a wedge angle of 25° to 33° measured perpendicularly to the flank of the cutting edge.

In accordance with other embodiments, a blade shape may be produced in a metal-removing manner from a roll-hardened profile blank having a hardness of at least 30 HRC. The metal-removing manner can include milling the edge regions.

Further, the scratching edge can, in a longitudinal extension thereof, be embodied in a perpendicular or lagging manner to the cutting edge in the direction of the flank.

In other embodiments, the scratching edge can project away from the cutting edge or can be formed projecting out of the flank with a distance of up to 0.8 mm from the cutting edge.

According to still other embodiments of the invention, the base body may be formed from a cold worked steel with a composition according to Register of European Steels number classes 20 through 23 or from a high speed steel according to number class 33.

In accordance with still yet other embodiments of the present invention, a material of the base body may include an iron-based alloy with good annealing properties and a surface in the edge region at least partially bears a coating.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates a cross section of an embodiment of a disposable cutting blade;

FIG. 2 illustrates a top view of the disposable reversible cutting blade depicted in FIG. 1;

DETAILED DESCRIPTION OF THE EMBODIMENTS

Figure 3:
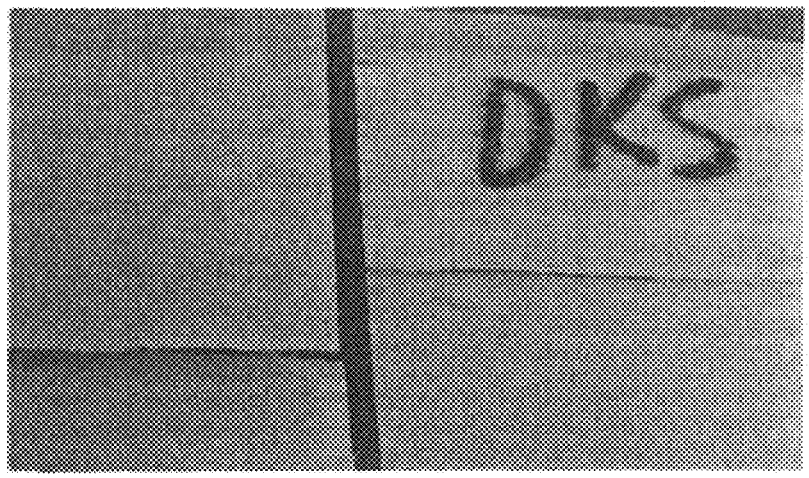
FIG. 3 shows chips produced by blades having defect-free (sharp) edges.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows in cross section an embodiment of a disposable cutting blade 1, e.g., a reversible cutting blade. Disposable cutting blade 1 includes a base body 2 and two edge regions 3.

In a first step, a base body 2 with a guide path 21 and an opposing pressure surface 22 is formed, e.g., in a roll groove from a round primary material (not illustrated) by cold rolling. As a result of a free spreading of the primary material in the roll groove, edge regions 3 are formed by a material flow. Base body 2 can be formed from a cold worked steel with a composition according to Register of European Steels number classes 20 through 23 or from a high speed steel according to number class 33. Further, the material of base body 2 can be an iron-based alloy with good annealing properties and a surface in the edge region at least partially bears a coating.

In a second step of a production of disposable cutting blade 1, a shaping of cutting edges 31 with a wedge angle $\beta$ of 26° to 34° and a shaping of scratching edges 32 projecting away from the flanks 311 occur by a milling of the edge regions 3 in places.

In FIG. 2, a top view of the disposable reversible cutting blade 1 illustrated in cross section in FIG. 1 is shown.

Edge regions 3 project away in a transverse direction from the base body 2 with a pressure surface 22, in which edge regions cutting edges 31 are formed. Perpendicular to the cutting edges 31, scratching edges 32 with a wedge angle $\alpha$ of 25° to 33° project away from the flanks 331. The side faces forming the scratching edge 32 can be embodied in a straight or curved manner.

Figure 4:
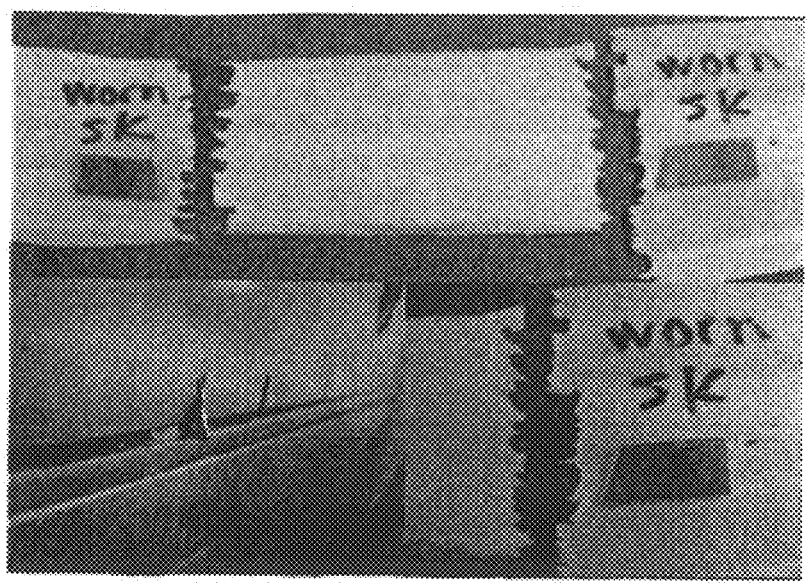
FIG. 4 shows chips produced by blades having worn (dull) edges.

Further, FIG. 3 shows the advantageous effect of blades with sharp cutting edges 32 as compared to the effect of blades with worn (dull) edges 32, as shown in FIG. 4.

Thus, in embodiments, disposable cutting blade 1 can be changed, e.g., after a loss of sharpness or after wear of the cutting edges occurring during operation, and replaced by a new, unused blade 1. Because these blades 1 according to embodiments have hardened cutting edges 31 and hardened scratching edges 32, following a simple and economical blade change, new/replacement blade 1 has sharp cutting edges 31 and scratching edges 32 available for use.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for producing a disposable cutting blade with a profiled cross section for a device for chipping wood, the method comprising:

heating a primary material of a hardenable material in a soft-annealed state having a worked surface to a temperature above room temperature, but below a conversion temperature Ac1;

rolling the primary material to form a profile blank having a cross-sectional profile that includes at least one gaged guide path and at least one edge region;

machining via metal-removing the at least one edge region in a longitudinal direction of the profile blank to form a cutting edge and to form spaced apart scratching edges, said cutting edge being located at an end of a flank that is oriented at a first wedge angle "β" and said scratching edges being oriented perpendicularly to the cutting edge and being disposed at one end of a second wedge angle "α"; and after the machining, subjecting the at least one edge region to continuously hardening, wherein the disposable cutting blade is produced after the continuously hardening.

2. The method according to claim 1, wherein the hardenable material comprises hardenable steel or a hardenable steel alloy.

3. The method according to claim 1, wherein the temperature is achieved within a range of a cubic-space-centered atomic structure of the primary material.

4. The method according to claim 1, wherein the at least one gaged guide path is a groove.

5. The method according to claim 1, further comprising storing the profile blank prior to the metal-removing machining.

6. The method according to claim 1, wherein each the at least one edge region of the cutting blade is continuously hardened to a predetermined depth.

7. The method according to claim 1, wherein, before the machining, each cutting edge includes ridges and wherein, after the machining, each cutting edge is free of said ridges.

8. The method according to claim 1, wherein the machining is milling with a milling tool.

9. The method according to claim 8, wherein the milling tool is a ceramic milling tool.

10. The method according to claim 1, wherein the primary material has a circular cross-section.

11. The method according to claim 1, further comprising feeding the profile blank during the continuous hardening.

12. The method according to claim 1, wherein each scratching edge is arranged on an end of a wedge-shaped projection having surfaces defined by the second wedge angle "α".

13. The method according to claim 12, wherein the profile blank has a hardness of at least 30 HRC before the subjecting and wherein, after the hardening, the edge regions have a hardness that is between 58 and 63 HRC up to a depth of at least 1.5 mm.

14. A method for producing a disposable wood chipping cutting blade with a profiled cross section having cutting edges and scratching edges oriented perpendicular to the cutting edges, the method comprising:

heating a steel or iron-based alloy material to a temperature that is greater than room temperature and lower than a conversion temperature Ac1;

cold rolling the steel or iron-based alloy material to form a profile blank whose cross-sectional profile comprises a guide path groove arranged between opposite facing edge regions;

subjecting each edge region to metal-removal machining to form the cutting edges and the scratching edges oriented perpendicular to the cutting edges; and after the metal-removal machining, subjecting the edge regions to hardening to achieve to a hardness of at least 58 HRC, wherein the cutting edges are defined by flanks oriented a first wedge angle "β" of 26 degrees to 34 degrees, wherein the scratching edges are arranged on ends of tapered projections defined by a second wedge angle "α" of 25 degrees to 33 degrees, and wherein the tapered projections are located on an opposite side of the cutting blade from a side having the guide path groove, and wherein the disposable wood chip cutting blade is produced after the hardening.

15. The method according to claim 14, wherein the hardening comprises continuous hardening.

\* \* \* \* \*